United States Patent [19]
Buchholz et al.

[11] Patent Number: 4,745,547
[45] Date of Patent: May 17, 1988

[54] VECTOR PROCESSING

[75] Inventors: Werner Buchholz; Ronald M. Smith, both of Wappingers Falls, N.Y.; David S. Wehrly, Montrose, Pa.

[73] Assignee: International Business Machines Corp., Armonk, N.Y.

[21] Appl. No.: 745,040

[22] Filed: Jun. 17, 1985

[51] Int. Cl.4 .............................................. G06F 7/38
[52] U.S. Cl. .................................................. 364/200
[58] Field of Search ................ 364/200, 900, 736, 748

[56] References Cited

U.S. PATENT DOCUMENTS

| | | | |
|---|---|---|---|
| 4,128,880 | 12/1978 | Cray, Jr. ............................ | 364/200 |
| 4,172,287 | 10/1985 | Kawabe et al. .................... | 364/200 |
| 4,270,181 | 5/1981 | Tanakura et al. .................. | 364/736 |
| 4,293,941 | 10/1981 | Muraoka et al. ................... | 364/200 |
| 4,541,047 | 9/1985 | Wada et al. ........................ | 364/200 |

OTHER PUBLICATIONS

Hwang et al., "Computer Architecture and Parallel Processing", 1984, pp. 275-277.

*Primary Examiner*—Gareth D. Shaw
*Assistant Examiner*—Kevin A. Kriess
*Attorney, Agent, or Firm*—Joseph A. Biela

[57] ABSTRACT

A vector processor is disclosed which processes vectors that can have more elements than a vector register can contain at one time. Vectors are processed in sections in which the section size is determined by the number of element locations in a vector register. A vector count register controls the number of elements processed by each vector instruction. A vector interruption index points to the first or next element in a vector to be processed by a vector instruction either when it is first issued or when it is re-issued following an interruption of the vector instruction. A general purpose (length) register contains the entire length of the vector to be processed. A single instruction, which starts a vector sectioning loop, provides for the smaller of the section size or the content of the length register to be loaded into the vector count register. During the operation of the sectioning loop, the vector count register is repetitively subtracted from the content of the first general purpose register and the resulting residual vector length is placed back in the first general purpose register until all of the elements have been processed.

4 Claims, 6 Drawing Sheets

VECTOR C

| ITERATION | CC | VCT | G0 | G1 | G2 | G3 |
|---|---|---|---|---|---|---|
| START | — | — | 20 | SA A | SA B | SA C |
| 1 | 2 | 8 | 12 | SA A + 64 | SA B + 64 | SA C + 64 |
| 2 | 2 | 8 | 4 | SA A + 128 | SA B + 128 | SA C + 128 |
| 3 | 3 | 4 | 0 | SA A + 160 | SA B + 160 | SA C + 160 |

VECTOR PROCESSING

Background of the Invention

1. Field of the Invention

This invention relates to the processing of vectors having lengths which exceed the size of vector registers. More particularly, this invention relates to the processing of sections of vectors, where each section has up to the number of vector elements in a vector register, by vector instructions some or all of which are interruptible.

2. Prior Art

U. S. Pat. No. 4,128,880 assigned to Cray Research, Inc. discloses vector processing in a computer which is achieved by means of a plurality of vector registers. Operations are performed on vectors from vector register to a functional unit and back to a vector register. During vector processing, elements of one or more vector registers are successively transmitted as operands to a functional unit, and results are transmitted from a functional unit to a receiving vector register. Each functional unit has an input for receiving operands and an output for delivering results computed or processed by the functional unit. As soon as results are received in the result vector register, they become available, due to chaining, as operands to other functional units. The vectors that are processed are, at most, the same size, i.e. have the same number of elements, as the vector registers.

European Patent Application No. 44 563 assigned to Hitachi, Ltd., discloses a vector operation involving a number of vector elements (k) greater than the length of a vector register (l). A vector processor detects the necessity for and provides for the repetition of a vector operation after l elements have been processed by one vector instruction series when k is greater than l. In the example provided in the application, three separate vector address register circuits are used to update vector addresses in three separate vector address registers. In other words, for each vector address register, there is a corresponding vector address circuit which updates the content of that vector address register. Furthermore, since vector addresses are only loaded, stored and updated in vector address registers, the full arithmetic and logical instruction set is not available to operate on the vector addresses in the vector address registers. Instructions do not operate on vectors in storage. All vectors, during the execution of one program, have the same vector lengths, i.e. same number of vector elements, and the vector instructions are not interruptible.

Vector processing is discussed in a book by P. M. Kogge entitled "Architecture of Pipelined Computers", published by McGraw-Hill and Hemisphere Publishers, 1981.

IBM Technical Disclosure Bulletin, Vol. 25, No. 12, May 1983 pages 6711-6712, entitled "Storage Access-Exception Detection for Pipelined Execution Units" by Garcia et al. discloses that a storage access-exception condition can occur only after processing of all preceding vector elements is completed.

It is therefore an object of this invention to process vectors of any length, which may be greater or less than the size of the vector registers, with the same set of vector instructions.

It is an object of this invention to perform arithmetic and logical operations on sections of vectors which have been loaded in registers and on sections of vectors stored in memory.

It is a further object of this invention to use vectors in memory directly as operands.

It is another object of this invention to load and store addresses of vectors in general purpose registers where each vector address referenced by a vector instruction can be automatically updated by the vector hardware after each vector instruction references a vector address.

It is a further object of this invention to load and store addresses of vectors in general purpose registers where each vector address referenced by a vector instruction can be manipulated by arithmetic and logical instructions.

Another object of this invention is to process vectors by interruptible vector instructions that, once interrupted, can be re-issued in order to resume execution from the point of interruption if the contents of several registers are restored to their pre-interruption values.

SUMMARY OF THE INVENTION

A data processing system includes storage, registers at least one of which is a vector register subdivided into vector element locations, operands including vector elements of at least one vector, and at least one central processing unit that executes instructions some of which operate on the operands. A method is claimed for operating on the vector elements to include:

1. loading a first register with the number of vector elements to be operated on by one of the instructions, 2. updating at least one pointer register for continuously identifying the next vector element to be operated on by the instruction, 3. stopping the operation on each of the vector elements when the instruction is interrupted, or when the last of the vector elements is operated on as indicated by the first register, and 4. reissuing the instruction after the instruction is interrupted and resuming operation on one of the vector elements in at least one vector identified by at least one pointer register.

DESCRIPTION OF THE PREFERRED EMBODIMENT

Hardware

Figure 1:
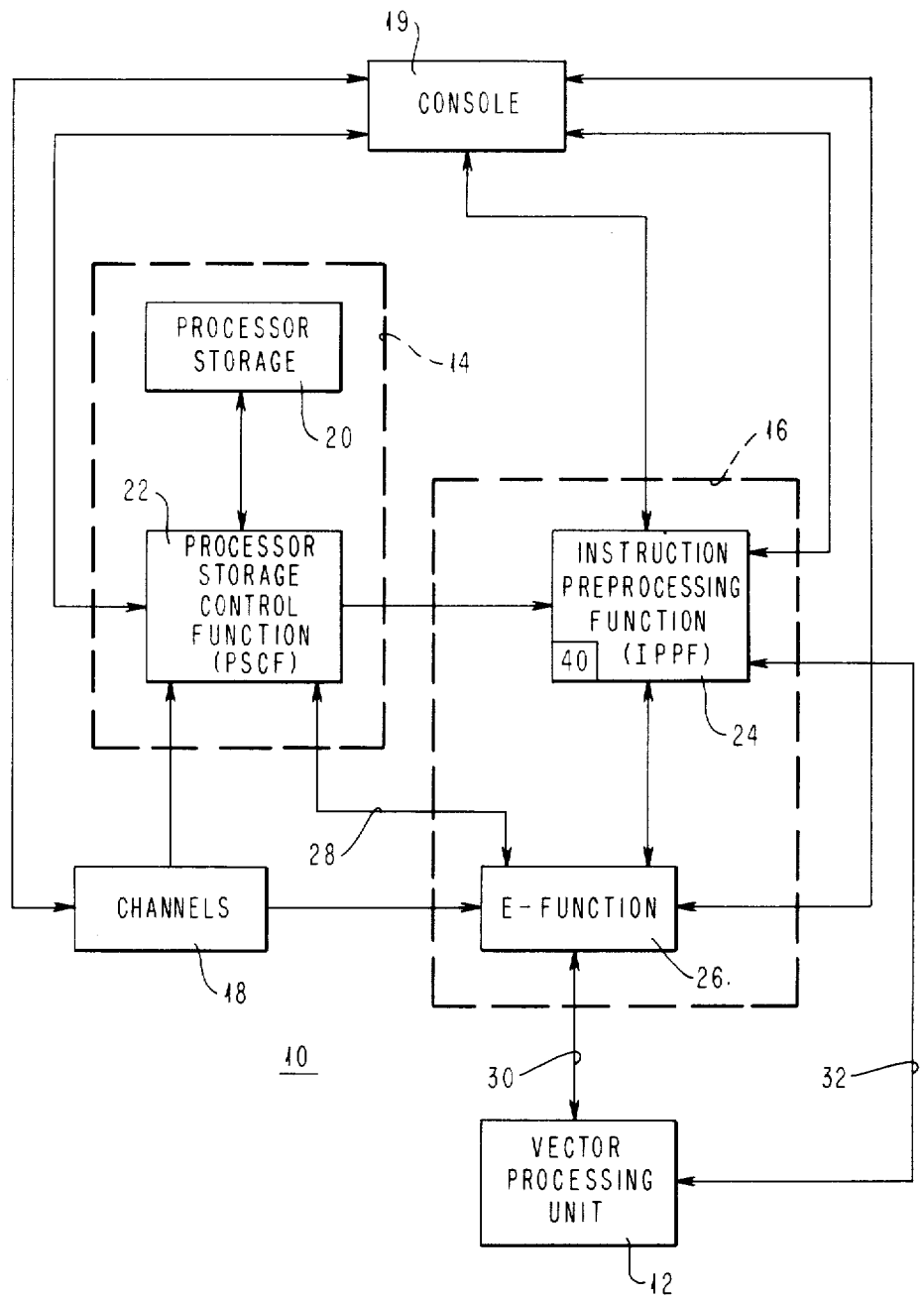
FIG. 1 is a block diagram of a data processing system which includes the vector processing unit of the present invention.

FIG. 1 is a block diagram of data processing system 10 including a vector processing unit (VPU) 12. With the exception of VPU 12, the remainder of FIG. 1 represents a "base" data processing system which includes memory 14, central processing unit (CPU) 16 (operating, for example, in the IBM System 370-XA mode), console 19 and channels 18. The console is used by the system operator for interacting with the various control, e.g. initialization, programs.

Memory 14 includes processor storage 20 and processor storage control function (PSCF) 22. The memory is utilized for the storage of program instructions and operands including vector operands to be processed by VPU 12. The PSCF obtains sequences of instructions from memory 14 and initiates the transfer of operands to CPU 16. ("Operands" include data as well as the result of operation on data.)

CPU 16 includes instruction pre-processing function (IPPF) unit 24 for decoding instructions and E-function unit 26 for executing instructions transferred to it from the IPPF. These units as well as the base data processing system are more fully described in U. S. Pat. No. 4,200,927 which is assigned to the assignee of the present invention and incorporated herein by reference. IPPF 24 fetches and decodes all instructions including those executed by E-function unit 26 and those executed by VPU 12. As described in the above-cited patent, E-function unit 26 is connected to memory 14 via data bus 28 for executing instructions, and includes a microprogram control store for generating instruction execution control signals. Results of instruction executions in E-function unit 26 are communicated back to IPPF 24 which, in response, controls the sequence of instruction execution.

Interconnection of VPU 12 with the base data processing system is by means of interface bus 30 between VPU 12 and E-function unit 26, and interface bus 32 between VPU 12 and IPPF 24.

Figure 2:
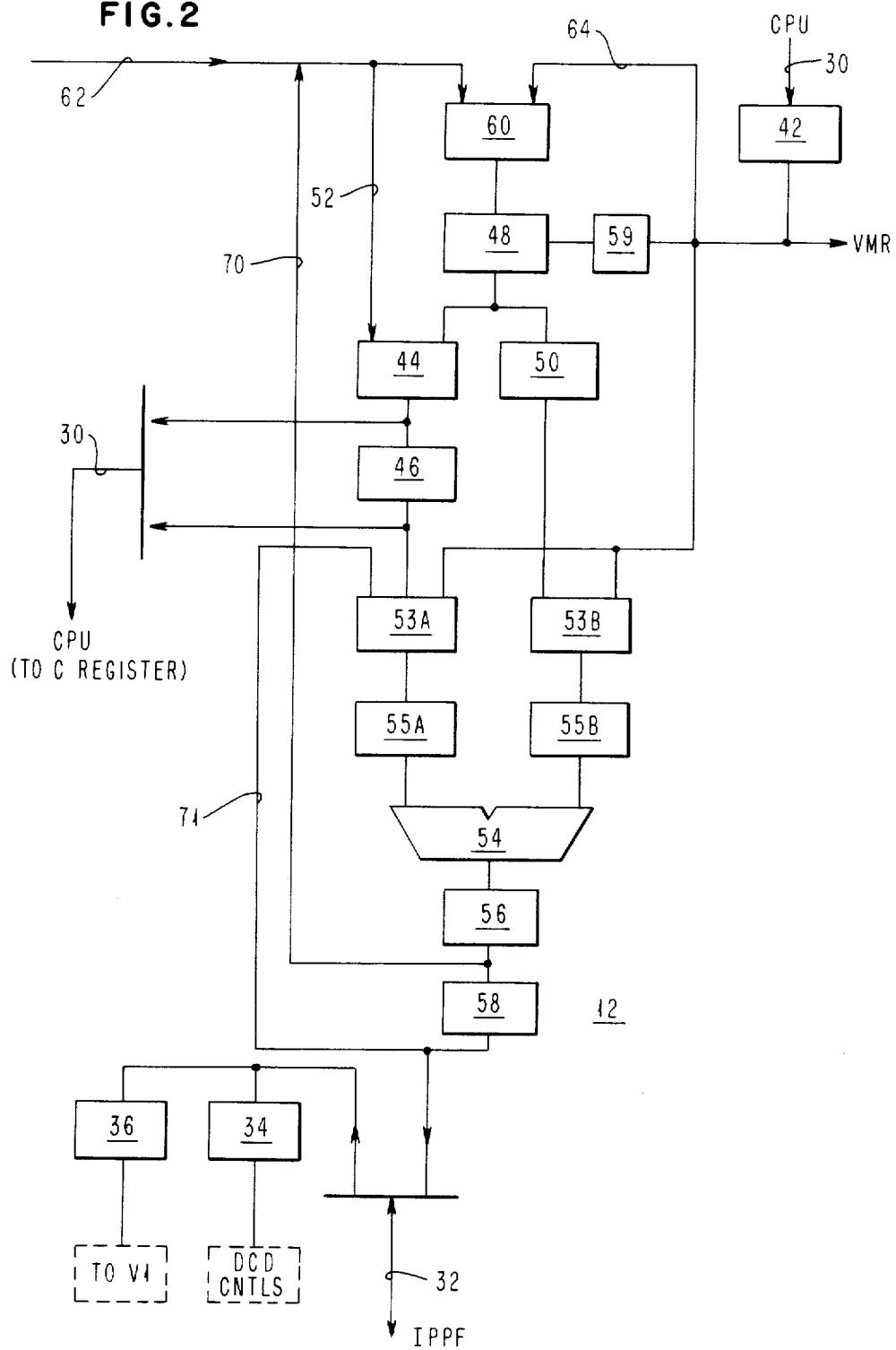
FIG. 2 is a block diagram of the hardware paths, registers and functional units of the vector processing unit of FIG. 1.

Interface bus 32 transfers vector instruction operation codes (op codes) from a queue in IPPF 24 to vector instruction register 34 and vector instruction buffer 36 in the VPU (see FIG. 2). The bidirectional interface bus 32 is also utilized to transfer address information between ALU putaway register 58 and general purpose stride register 40. Stride register 40 (see FIG. 1) contains information specifying the memory address separation between elements of a vector having ordered elements. In other words, the stride is the number of element positions by which the operation advances when processing proceeds from one element to the next. (See below for a more complete description of stride.)

The transfer of data between VPU 12 and memory 14 is provided along a data bus. Specifically, data from memory 14 is provided on data bus 28 through E-function unit 26 to data register 42 in VPU 12 via bidirectional interface bus 30. Data register 42 (shown in FIG. 2) serves as a buffer for data transmitted to it from E-function unit 26 via interface bus 30. Data transferred from VPU 12 to memory 14 is provided from stage A register 44 (or lambda register 46) in VPU 12 to a register in E-function 26 via interface bus 30.

FIG. 2 shows paths, registers and functional units of VPU 12 several of which were discussed above. FIG. also includes an array of vector registers (VRA) 48 which is shown in more detail in FIGS. 3a and 3b.

Figure 3A:
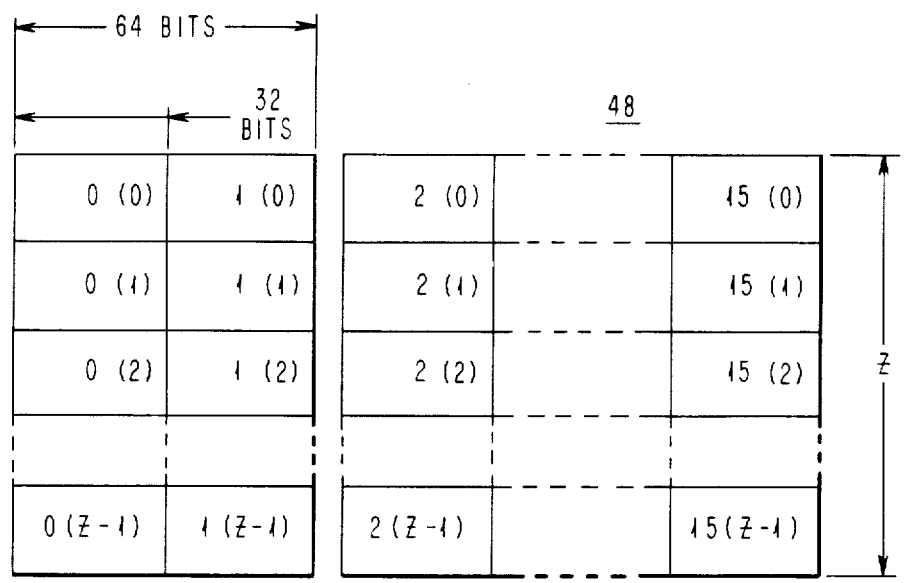
FIG. 3a is a block diagram representing the vector registers in the vector processing unit of FIG. 1.

In particular, FIG. 3a shows sixteen physical vector registers numbered (ordered) from 0 through 15 each having Z element locations numbered from 0 through $Z-1$ where Z is a number, e.g. 128, fixed in a particular data processing system. Unlike general purpose registers and floating-point registers, the vector registers are multipurpose in that vectors of both binary (arithmetic or logical) and floating-point data can be stored therein. The vector registers are used to hold one or more vector operands for arithmetic, comparison, logical, load and store operations. Depending on the operation, a vector may occupy a single vector register having Z elements each 32 bits wide or an even-odd pair of registers (vector register pairs) if the physical registers, in which corresponding elements are combined, form double word (64 bit) operands. Vector registers include vector mask registers (described below) as well as vector registers that contain vector operands, i.e. vector data registers.

Figure 3C:
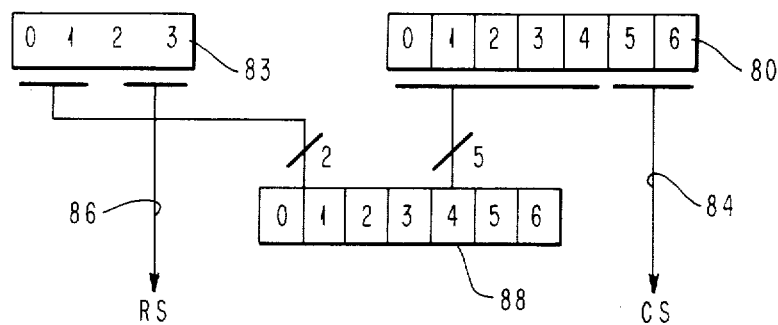
FIG. 3c is a block diagram showing the addressing of the vector registers in the vector processing unit of FIG. 1.
Figure 3B:
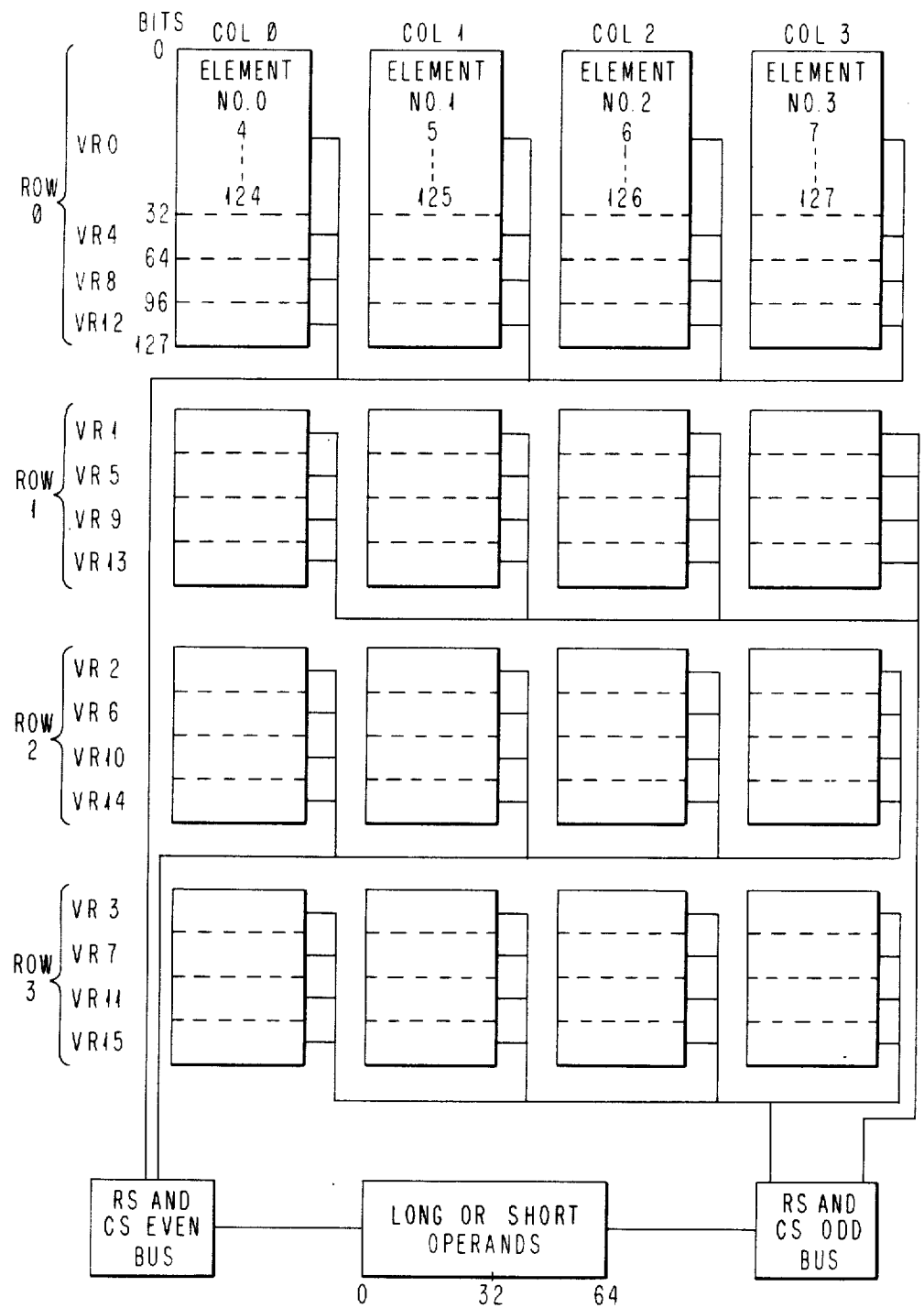
FIG. 3b is a block diagram showing the vector registers of FIG. 3a as chips grouped by fours to provide interleaving.

FIG. 3b shows the sixteen vector registers of FIG. 3a, with each vector register (VR) consisting of 128 four-byte elements. From a hardware standpoint, the entire array is in 64 array chips. Each chip is nine bits wide, i.e. eight bits plus a parity bit. Since each array chip is limited to a single read/write per cycle, the vector registers are 4-way interleaved. Each array column represents one interleave which consists of 16 chips grouped by 4. Each row represents four vector registers. The vector registers can provide two elements per cycle for vector operations in VPU 12 and accept one element per cycle from either a vector operation or E-function 26.

Addressing of vectors in vector register array (VRA) 48 involves address registers 59 (see the discussion of VEARs below). Data vectors that are written into vector addresses in the vector register array are transmitted to vector register array putaway register 60. Input to this register is provided on line 64 from data register 42 and on putaway bus 62 from several sources. Vector elements in vector addresses in storage are often accessed by a regular sequence of addresses. The instruction (accessing the vector elements) specifies a general purpose register in CPU 16 for containing the starting address of the vector in storage and, optionally, another general purpose register for containing the stride (stride register 40). The starting address contained in the general purpose register is updated automatically as successive elements in storage are accessed. When an interruption occurs, the content of the general purpose register is the storage address of the next vector element to be processed following the interruption. (This is the element that would have been processed had the interruption not occurred.) Such automatic updating of vector addresses is used to process a vector in sections as will be explained below.

Referring to FIG. 2, vector operands (data) read from the vector register array are transmitted to stage A register 44 and stage B register 50. (Stage A register 44 also accepts data transmitted from a vector mask register (VMR) on line 52. A vector mask register (having Z bits) is used as the target of the result of vector-compare operations, source and target of logical operations on bit vectors, and source of the mask for masked controlled operations.) Data from the stage A register is transmitted to E-function unit 26 via interface 30.

Lambda register 46 receives the data in the Stage A register and is used as a data delay register as well as a back-up register for data transmitted to E-function unit 26 from stage A register 44. The data delay is necessary to provide for proper access to vector register array 48. Data, which is properly shifted and aligned for floating point operations (via ALU shift registers 53A and 53B and ALU input registers 55A and 55B, is then transmitted to arithmetic logic unit (ALU) 54 for processing. The ALU (arithmetic means) is a parallel binary adder which performs addition and subtraction on binary, short precision and long precision vector operands. The ALU can also perform logical AND, OR and EXOR operations, and can logically shift an operand left 1, 2, or 3 bits. ALU register 56 maintains the output of ALU 54. ALU putaway register 58 serves as a delay register for data transmitted from ALU register 56 that is to be recycled to the ALU via line 71. Data that is to be written back to VRA 48 is gated to VRA putaway 60 via data bus 70. (The ALU putaway register and VRA putaway receive normalized logic input as a result of floating point operations.)

Vector instruction buffer 36 retains the vector instruction op code and vector register addresses received on interface bus 32 for use by other decode circuits in VPU 12 during instruction execution.

As shown in FIG. 2, vector operand data is obtained from either vector register array 48 or CPU 16 through data register 42. When two operands are provided by the vector register array, the first vector element fetched is provided to stage A register 44 and is subsequently manipulated by arithmetic or logical instructions in ALU 54 and thereafter transmitted to ALU putaway register 58 and VRA putaway register 60 (A-side data path). The second vector element fetched is provided to stage B register 50 and is subsequently manipulated by arithmetic or logical instructions in ALU 54 and thereafter transmitted through to ALU putaway register 58 and VRA putaway register 60 (B-side data path). Specifically, the first element of the operand on the A-side data path is read out of vector register array 48 one machine cycle earlier than the first element of the operand on the B-side data path. Thus, after two cycles, the first element on the A-side operand is in lambda register 46, the first element of the B-side operand is in stage B register 50, and the second element of the A-side operand is in stage A register 44. This initial offset of the elements in the A-side and B-side data paths accommodates the input/output (I/0) interface chip of the vector register array. The offset guarantees that only "one" read is made from any array chip during any given cycle. Therefore, a vector, i.e. the result of a vector operation, in VRA putaway register 60 is stored in vector register array 48 during each machine cycle. (VPU 12 also includes a multiply-divide unit and associated registers (not shown) which are connected to the A-side and B-side data paths and which are described in the references cited herein.)

When an operation is to be performed on one vector operand from memory 14 (FIG. 1), together with one vector operand from a vector register in vector register array 48, the vector operand from the array is transmitted through the B-side data path. The vector operand from memory 14 (through E-function unit 26) is first transmitted to data register 42 and then through the A-side data path. The vector result of the operation is written into a destination vector register in vector register array 48. ("Operation" includes taking data from storage as well as loading and storing data and results in storage. "Results" include the outcome of arithmetic and logical operations on the contents of vector registers and vector mask registers as well as the loading of vector registers and vector mask registers. Results may be stored in scalar or vector registers as well as in storage. Vector elements loaded in vector registers can be returned to storage.)

When a sequence of vector elements of a vector operand are to be transferred from memory 14 to VPU 12, the data transfer path for a vector load instruction begins at a register in CPU 16 and continues through interface bus 30 to data register 42. The elements are then stored in (written into) a vector register in vector register array 48 via line 64 and vector register array putaway register 60. Each time an element is written into a vector register, the hardware increments the vector element address in registers 59 by the number of bytes in an element, i.e. 2, 4 or 8. At the same time, a vector interruption index (VIX), discussed below, contains the number of the element, in any vector register, to be processed (operated on) by a vector instruction. The VIX also indicates the number of vector elements that have already been operated on. The vector instruction can be interruptible. For load instructions that use a stride, the vector address will be incremented by other than the number of bytes in an element, i.e. 2, 4 or 8. In other words, CPU 16 calculates the storage address of each vector element fetched, and transfers data to the calculated element location at a maximum rate of one element for each cycle. For load instructions that use indirect addressing, ALU 54 calculates the updated address and transmits to CPU 16 on interface bus 32 (FIGS. 1 and 2). The CPU can then make another fetch request and transfer (new) data to VPU 12, i.e. to vector registers in VRA 48, on interface bus 30.

During vector store instructions, VPU 12 transfers data from a vector register in vector register array 48 through stage A register 44 and onto bidirectional interface bus 30 to CPU 16.

A register (also referred to herein as the vector count register or VCT) provides an indication of the number of vector elements that should be processed in a vector or section. VCT is not incremented or decremented during vector instruction execution. The vector count ranges in value from zero up to, and including, the section size. As indicated above, the VIX indicates the next element to be processed. This register is also utilized in those situations where interrupts occur, and the need arises to point to the (next) element to be processed in a vector register when processing is resumed for a particular vector instruction. The VIX is normally zero at the start of execution of a vector instruction (indicating that the first element in a vector register is to be element zero) and is reset to zero following execution of the vector instruction. The VIX then provides the starting location in the vector register(s) for subsequent resumption of the vector processing operation. The VCT register, together with the VIX, i.e. VCT-VIX, determine the number of elements in vector registers to be processed during vector operations.

With respect to the functional units shown in FIG. 2 and described above, the elements nf one vector in storage can be added to the elements of another vector in a vector register substantially as follows:

1. The first element of a vector operand is read from a source (first) vector register in vector register array 48 and subsequently stored in lambda register 46 after stepping through stage A register 44.

2. The first element of another vector operand is read from memory 14 to stage B register 50.

3. Both elements are gated in parallel into ALU shift registers 53A and 53B. For floating point data, normalization occurs and the elements are gated to ALU input register 55A and 55B.

4. Both vector elements are then operated on (added together) in the ALU and the result is gated first to ALU register 56 and, second, to ALU putaway register 58 as well as to VRA putaway register 60 via line 70. The VRA putaway register places the result into a sum location (in a destination vector register) in vector register array 48. (The ALU register also provides the result to the (stage A) shift register in ALU 54.)

5. The above described operation is repeated. The outcome of the addition operation is that sums of the elements of the vector in the first vector register are obtained by adding predetermined first vector elements to predetermined elements of the second vector in memory. The address of the second vector in memory is pointed to by a general purpose register.

The vector registers can provide two elements per cycle for vector operations and accept one element per cycle as the result of a vector operation or from CPU 16.

FIG. 3c shows the addressing of vector register array 48. Each column in FIG. 3b is independently addressable. The same address is presented to all sixteen array chips in a column so that it is possible to write into one column and read out of any one of the other three columns. There are three vector element address registers (VEARs) VEAR 1, VEAR 2, and VEAR 3. These registers are collectively represented as bits 80 in FIG. 3c. VEAR 2 and VEAR 3 normally contain the element (location) numbers of the source vectors that are being read during any given cycle. VEAR 1 normally contains the element (location) number of the vector (result) that is written into a destination vector register. VEAR 1 is also the vector interruption index (VIX) for most vector instructions that write results into the vector registers. Each VEAR is updated by its own hardware incrementor and is loaded from data in data (data-in) register 42 shown in FIG. 2. (VEAR 2 is the VIX for store type instructions.) The VIX is incremented only when a data valid bit associated with the VRA putaway register 60 is set to permit an updated writing into a vector register. Therefore, if an interrupt indicates that a vector register should not be updated, VIX will not be incremented and will provide a current indication of the next vector element that would have been processed during the instruction execution of a particular instruction prior to the interrupt. The content of VIX can be utilized when the interrupted instruction is re-issued after any fix-up routines have been performed since VIX points to the next element to be processed by the re-executed instruction following an interrupt. (VIX is also a field of a status register (VSR) which describes the current status of the vector (and the vector mask) register.)

The addressing of vectors in vector register array 48 also includes three vector address registers (VARs) collectively represented as bits 83 in FIG. 3c. The VAR bits are VAR 1, VAR 2 and VAR 3. VAR 2 and VAR 3 normally contain the numbers of the source vector registers from which data are being read. VAR 1 normally contains the numbers of the destination vector register in which data is being written. The VARs are initialized by the instruction itself at the beginning of its execution cycle.

Bits five and six of each VEAR provide a column select (CS) on line 84, and bits two and three of each VAR provide a row select (RS) on line 86. Seven-bit vector register array address 88 addresses a particular one of the Z locations (elements) in one of the vector registers in the array.

VPU 12 provides for operations on vectors of short and long floating point numbers and of binary integers. There are also operations on vectors of individual bits, which are generally used as mask bits. Operations are performed on operands in storage, in a vector register (or a pair of vector registers) or in a scalar (general or floating point) register or some combination thereof. That is, operations can be performed between a vector in storage and a vector register operand or between two vector register operands. One source operand can be a scalar while the other source operand can be a vector. The scalar can be treated as a vector having the same number of elements as the vector operand thereby giving a vector result, or a scalar result can be obtained. Instructions which use mask bits generally designate an implicit operand in the vector mask register. They also may designate storage and vector register operands.

A discussion of VPU 12 in data processing system 10 is found in co-pending U.S. patent application, Ser. No. 544,674 which is assigned to the assignee of the present invention.

Vector Sectioning

Vector sectioning is a technique, using the hardware described above, for processing vectors, the length of which exceeds the section size, i.e. the number of element locations in a vector register Other than the vector instructions themselves, only one new instruction is required for controlling the processing of vectors by forming a sectioning loop which ends on a branch statement. Initialization of registers (set-up instructions) are performed by pre-existing instructions which load general purpose registers and (for scalar floating point operands) floating point registers.

Vectors which may be larger than the size of the vector registers (section size) are processed generally as follows:

1. The vectors are considered to be divided into smaller sections at most equal to the number of element locations in a vector register. (A vector will not be divided if it has less than or the same number of elements as a vector register.)

2. A loop (sectioning loop) provides for the repetition of an appropriate sequence of vector instructions in order to process consecutively all sections of the sectionally divided vectors.

3. Addresses of vectors contained in general purpose registers are automatically updated by the vector hardware as each vector instruction that references a vector address in a general purpose register is executed. (In order to access any general purpose register which contains the address of a vector, a vector instruction merely references (points to) the general purpose register. There is no need for a circuit corresponding to each general purpose register since the general purpose registers are already provided and supported by CPU 16. As a result of the use of the general purpose registers in this manner, the full arithmetic and logic instruction set is available to operate on the vector addresses in the general purpose registers.)

The program containing vector instructions is independent of the section size. The program is capable of operating on vectors of different sizes, i.e. the number of vector elements can be less than, equal to or greater than the section size.

The following example program illustrates an operation on full vectors involving vector sectioning where vector elements are represented in main storage. Vectors in storage are accessed by sequential addressing.

Example Using Contiguous Vectors

Two contiguous vectors A and B in main storage are to be added, and the result stored in contiguous vector C. The number of element locations in each vector is identified by N. All vectors are in the long (64-bit) floating-point format which means that vector register pairs will be coupled in order to hold the long floating-point numbers.

|          |           |
|----------|-----------|
| L        | G0, N     |
| LA       | G1, A     |
| LA       | G2, B     |
| LA       | G3, C     |
| LP VLVCU | G0        |
| VLD      | V0, G1    |
| VAD      | V0, V0, G2|
| VSTD    | V0, G3    |
| BC       | 2, LP     |

Instruction L G0,N loads the entire length (number of elements N) of each vector in main storage in general purpose register zero (G0), acting as a length register, in binary format.

Instruction LA G1,A loads the address of vector A in general purpose register one (G1) acting as one of the address registers.

Instruction LA G2,B loads the address of vector B in general purpose (address) register two (G2).

Instruction LA G3,C loads the address of vector C in general purpose (address) register three (G3).

Instruction VLVCU G0, which has the label LP assigned to it, is the new LOAD VCT AND UPDATE instruction, which:

1. loads the smaller of the section size Z (the number of element locations in a vector register) or the content of the length register G0 in a register, referred to herein as the vector count (VCT) register. (This occurs only if the operand in G0 is positive. If the operand is negative or zero, the VCT register is set to zero.) The VCT is used to determine the last vector element to be processed by each vector instruction during each iteration of the sectioning loop formed by the VLVCU instruction and a conditional branch (BC) statement. The content of register G0 is treated as a 32-bit signed binary integer. The vector count and section size are treated as 16-bit unsigned binary integers. (The VCT is also a field of the vector status register (VSR).)

2. subtracts the content of the VCT from the content of the length register G0 and stores the result in the length register G0. In this way the length register G0 is updated to contain the residual vector length, i.e. the number of vector elements remaining to be processed. The VLVCU instruction sets a condition code (CC) to reflect the contents of G0 before updating register G0. The CC provides an indication of whether a complete vector will have been processed at the end of the loop. (G0 always contains the total number of elements remaining to be processed while VCT contains the number of elements to be processed during the next iteration of the loop formed by VLVCU and a subsequent branch instruction. The VIX contains the number of the next element in a vector register to be processed by a vector instruction. The VCT and the VIX determine the number of elements in vector registers to be processed during vector operations.)

For most vector instructions, the VSR is read (into a register in VPU 12 for later manipulation) at the beginning of the instruction and transmitted to the vector hardware (VPU 12) via bi-directional bus 30. Whenever the VCT is updated, the "new" VCT value is written into the appropriate field of the VSR. The VSR value is then gated through a shifter (64 bit) in VPU 12 and written back into an array in CPU 16.

As will be explained more fully below, the content of each general purpose (address) register referenced by each of the subsequent vector instructions, which addresses a vector in main storage (during execution of the instruction), is updated automatically by vector hardware in order to identify (point to) the next section of vector elements to be processed by each vector instruction during the next iteration of the sectioning loop. (Updating also identifies the next destination section in which the result of the processing will be stored.)

The VSR is in an array in E-function unit 26. This array is referred to as reserved working storage. Some vector instructions use all or a part of the VSR as an operand. Since the VSR resides in CPU 16, the CPU executes these instructions.

Instruction VLD V0,G1 loads a section of vector A, which is pointed to by the address of vector A that is stored in register G1, in vector register V0. The length of the section of vector A that is loaded is determined by the current vector count VCT.

Instruction VAD V0,V0,G2 adds a section of vector B, that is pointed to by the address of vector B which is stored in register G2, and the section of vector A, which was previously loaded in vector register V0, and stores the result in the vector register V0. Element by element, the section of vector B is added to the section of vector A (which is in vector register V0) and the result is placed in vector register V0. (Note that the VAD instruction uses a format that explicitly designates three operands: two source operands (V0,G2) and one target operand (V0). In this case, an interruptible arithmetic operation is performed on vectors in registers. Instruction VSTD V0,G3 stores the result. The length of each vector operand section and of the result section is determined by VCT and by the VIX. (For other instructions, similar to VAD, the operands could be in storage. In this case, interruptible arithmetic and logical operations would be performed on vectors in main storage.)

Instruction BC 2,LP tests the condition code (CC) to determine whether the content of the length register G0 is still greater than zero. If G0 is zero, then every section of each vector has been processed and the loop formed by the VLVCU and BC instructions has been completed. Otherwise, a branch to the VLVCU instruction, labeled LP, will occur in order to continue the processing of other vector sections. The BC instruction is a conditional branch instruction for providing conditional branching in the loop. In this embodiment, if condition code 2 is set, then the VLVCU instruction has set the VCT register to the section size. This means that a full section of vector elements was processed in the sectioning loop and that more remain to be processed.

Figure 4:
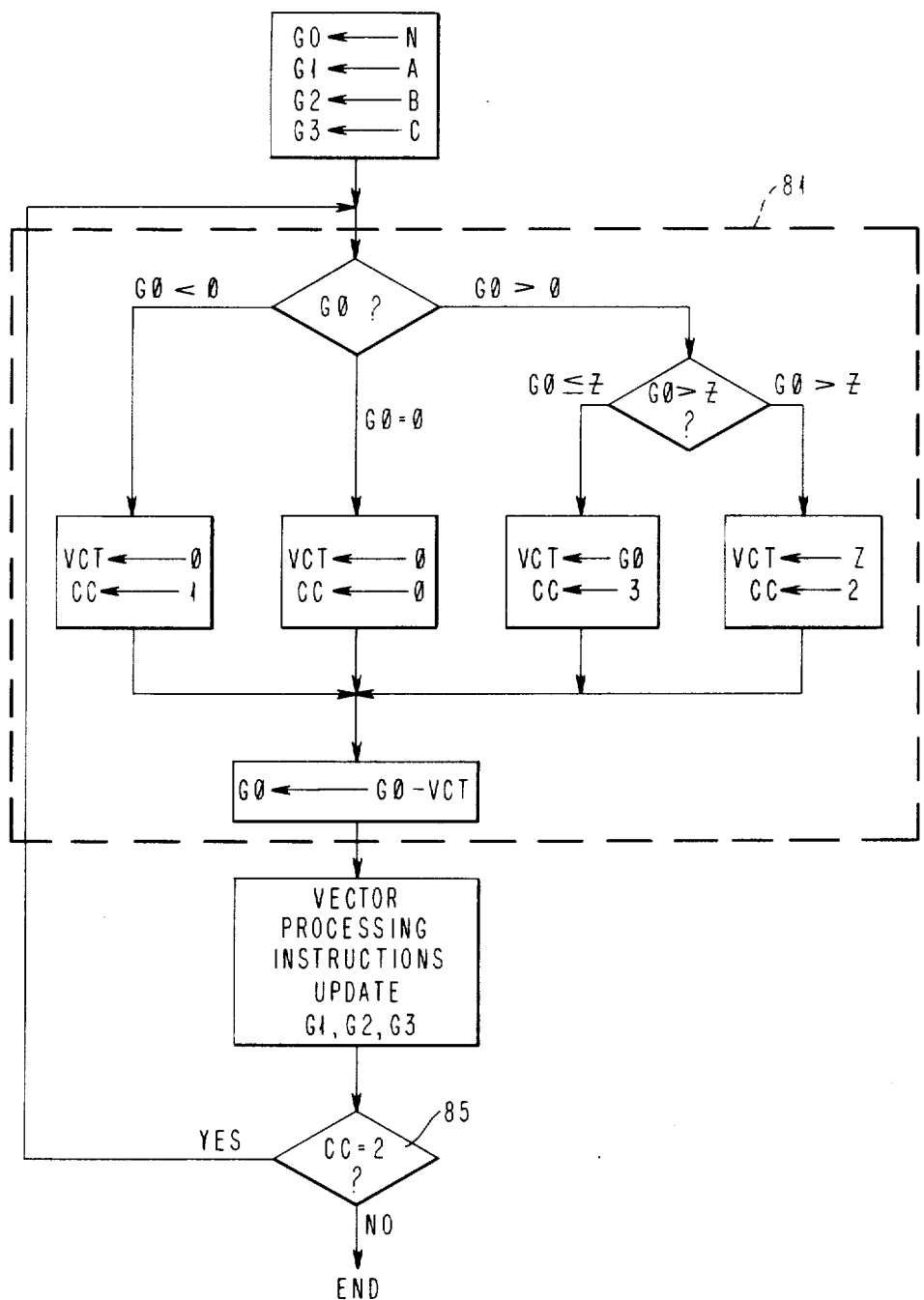
FIG. 4 is a flow chart representing the operation of a vector sectioning loop during the executing of vector instructions in the vector processing unit of FIG. 1.

A flow chart which graphically represents the operation of vector sectioning as disclosed herein is shown in FIG. 4. In the flow chart, G0 represents the length (number of elements N of a vector) register, VCT represents the vector count register, CC represents the condition code, Z represents the section size and G1-G3 represent general purpose registers which contain the address of vectors. The operation of the hardware implemented VLVCU instruction is shown within dotted line block 81 in FIG. 4. The conditional branch (BC) instruction is represented by decision block 85. The flow chart is self-explanatory in view of the discussion provided herein and will not be explained further.

For purposes of further illustration of the above example, assume that the section size is eight (8) elements and that the number of elements of each vector in main storage is 20 elements. Three iterations would be required of the loop, formed by the VLVCU instruction and the BC instruction, such that three sections, i.e. two complete sections of eight elements and one partial section of four elements, in each vector would be processed by the intervening vector instructions before the loop ended. Specifically, during the first iteration, the first eight-element section of vector A and the first eight-element section of vector B are added in eight-element vector register V0 (having paired vector registers 0 and 1 to hold long vector elements) and the result is subsequently stored in the first eight-element section of vector C in main storage. During the second iteration, the second eight-element section of vector A and the second eight-element section of vector B are added in vector register V0 and the result is subsequently stored in the second eight-element section of vector C in main storage. During the third iteration, a partial section of four elements of vector A and a partial section of four elements of vector B are added in vector register V0 and the result is stored in the remaining four elements of vector C in main storage. The loop is then exited.

Figures 5A, 5B:
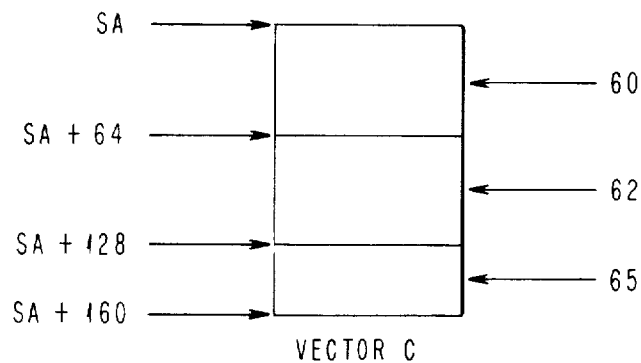
FIG. 5a represents a vector C of length 20 for a section size of 8 following each completion of the vector sectioning loop of FIG. 4.
FIG. 5b is a table summarizing the condition code settings and register contents during the operation of the vector sectioning loop as shown in FIG. 4.

FIG. 5a shows this vector C after exiting from the loop. Each element contains eight bytes, so that a complete eight-element section occupies 64 bytes in storage. The first eight-element section is stored after first iteration 60 beginning at the starting address of vector C through SA+63 bytes. The second eight-element section (sixty-four bytes) is stored after second iteration 62 from SA+64 through SA+127. The partial section of four elements is stored after third iteration 65 from SA+128 to SA+159.

FIG. 5b is a table summarizing the condition code (CC) settings, the content of the VCT register and the contents of the general purpose (length and address) registers, for the above example, prior to the first execution of the VLVCU instruction and at the end of each of the three iterations of the loop. During the execution of the loop, the VCT register will contain a number in the range zero up to and including the section size. Referring to FIG. 5b, before the VLVCU instruction is executed, the CC setting and the VCT contents are irrelevant. General purpose register G0 contains 20 representing the number of elements of each vector in main storage, general purpose register G1 contains the starting address of vector A (SA A), general purpose register G2 contains the starting address of vector B (SA B) and general purpose register G3 contains the starting address of locations for vector C (SA C). At the start of the first execution of the loop of instructions (first iteration), beginning with VLVCU and ending with BC, the content of the length register G0 is positive. As shown more clearly by the flow chart in FIG. 4, the smaller of the section size (8) or the content (20) of the length register G0 is stored in the vector count (VCT) register such that, in the table of FIG. 5b, the VCT register contains 8. The condition code is set to 2. The length register G0 is then updated by subtracting the content (8) of the VCT register from the content (20) of the length register G0 and storing the result (12) in the length register G0. Since each element represents eight bytes, the vector hardware automatically updates the content of each general purpose (address) register, G1, G2 and G3, to its respective starting address (SA) plus 64 (bytes) because eight vector elements in each vector will have been processed during the first iteration of the loop. The condition code (CC) is tested by the BC instruction to determine whether length register G0 is still greater than zero. (The CC is still 2 indicating that the loop is to be repeated.) At the start of the second execution of the loop of instructions (second iteration), the smaller of the section size (8) or the current content (12) of the length register G0 is stored in the vector count (VCT) register such that the VCT register contains 8. There is no change to CC. The length register is then updated to 4 (G0 - VCT) and each general purpose register is automatically updated by again adding 64 to the previous contents, since eight additional vector elements in each vector will have been processed during the second iteration of the loop. The condition code (CC) is tested by the BC instruction. The CC is still 2 indicating that the content of register G0 is still greater than zero. At the start of the third (and in this case final) execution of the loop of instructions (third iteration), the smaller of the section size (8) or the content (4) of the length register G0 is stored in the vector count (VCT) register such that the VCT register now contains 4. The condition code is set to 3 and register G0 is set to zero. Each general purpose register is automatically updated by adding eight times four (representing four eight-byte elements), or 32, to the contents at the end of the last iteration as each instruction in which they are referenced is executed. The conditional branch instruction (BC) fails to branch (since branching will only occur when the condition code (CC) is 2), thereby terminating the loop. (The CC is preserved in the old program status word (PSW) and is restored automatically when the old PSW is reloaded after a program interruption (discussed below) is completed).

Each vector instruction which refers to a vector in storage during an iteration of the loop causes, through the vector hardware, a general (address) register to be updated to point to the beginning of the next section of vector elements to be processed (see the explanation of stride below) during the next iteration of the loop. Each general register referenced in a vector instruction is updated by only one updating circuit in the CPU. Since one vector instruction handles only one vector in storage at a time, then multiple general registers may be used to address multiple vectors within a sectioning loop without loss of generality. For example, SA A and SA B point to the starting addresses of vectors A and B, respectively, and, specifically, to the sections that will be added together in vector register V0 during the first iteration of the loop and subsequently stored in the first eight-element section in vector C in main storage. After the first iteration, SA A+64 and SA B+64 point to the starting addresses of the second eight-element section in vectors A and B, respectively, which will be added together in vector register V0 during the second iteration of the loop and subsequently stored in the second eight-element section in vector C. After the second iteration, SA A+128 and SA B+128 point to the starting addresses of the third section in vectors A and B, respectively. In this case, the remaining section in vector A and in vector B each have four elements which will be added together in vector register V0 during the third (and final) iteration and subsequently stored in vector C in main storage. (The vector address registers are updated again during the third iteration to point to the starting addresses of what would be the next section if the vector operation were to continue.) As indicated above, the content of each vector address register is updated (points to a next section of the vector) following the execution of an instruction which refers to (a prior section of) that vector. If a vector address is needed more than once within the loop, a separate general purpose (address) register may be assigned for each use of the same vector address. For example, if vector B were to be used more than once in a sequence of vector instructions within the loop, an LR G4,G2 instruction following the LA G2,B instruction could be programmed. As a result, both registers G2 and G4 would contain the starting address of vector B. Registers G2 and G4 could then be referenced in two instructions so that the address of vector B could be utilized more than once during one iteration of the loop. This would avoid the possibility of inadvertently updating the same vector address register more than once during one iteration of the loop if it were referenced more than once.

Note that the VLVCU instruction sets the condition code (CC) to reflect the current contents of length register G0 and vector count VCT. However, if in a different program an intervening instruction is able to change CC, then another instruction, such as the LOAD AND TEST instruction LTR G0,G0 should precede the BC instruction in order to test the content of the length register G0 and to effectively re-establish whether the condition code is 2 or not.

Operands in Scalar Registers

Operations on floating-point or binary vectors may specify as one source operand the contents of a scalar register; the other operand being a vector. The scalar operand is treated as if it were a vector of length VCT, i.e. as the same length as the vector operand, but with identical elements. Therefore, a scalar operand can be loaded into a vector register or used in an arithmetic instruction. Operations on scalar and vector operands can yield either scalar or vector results.

Stride

When a vector is not contiguous, that is, successive elements are not contained in adjacent storage locations, a vector processing instruction specifies two general purpose registers, one for the starting address as before, and one for the stride. The stride is the number of element locations by which the operation advances when instruction processing proceeds from one element to the next. Of course, the maximum number of vector elements to be processed at one time, i.e. during one execution of a vector instruction, is specified by the vector count (VCT) register as indicated above.

In the above example in which all vectors are contiguous, the stride (contained in general purpose (stride) register 40) for the three vector instructions VLD, VAD and VSTD is "one" indicating that successive vector elements are in adjacent storage locations in main storage. This stride is the default when no general register is specified for the stride. For a stride of "T" and an elements size (in bytes) of "W", addresses of successive storage elements of vector A are SA A, SA A+WT, SA A+2WT, . . . The value of W is 2, 4 or 8 depending on whether the operation code is the vector instruction format specifies the elements to be half-words, words, or double words.

In certain vector instruction formats, a field (RT) designates a general register which contains the stride. If the RT field is zero, a stride of one is assumed. In the same vector instruction formats, a field (RS) designates a general register (GR) which contains the starting address of the first element of the vector operand, in storage, to be processed. This general register is then updated for each element processed such that a vector address (in GR) is updated when the vector is referenced in a vector instruction. Alternatively, the vector address can be updated in an internal register and the GR will only receive the updated vector address from the internal register when the vector instruction is completed or is interrupted.

Vector Interruptions

General interruption action is known in the art and includes storing the program status word (PSW) as an old PSW, storing information identifying the cause of the interruption, and fetching a new PSW. Further processing is specified by the instructions at the address in the new PSW. One of the functions performed by the instructions at the address in the new PSW is the saving of the registers used for vector processing, including vector registers, VCT and VIX. Each class of interruption is distinguished by the storage locations at which the old PSW is stored and from which the new PSW is fetched. The cause may be further identified by an interruption code. The condition causing the interruption is indicated by a coded value placed in the rightmost seven bit positions of the interruption code. In the case of program interruptions, the program interruption code is stored at real locations 142 through 143.

All vector instructions which can operate on multiple elements of arithmetic vectors in storage or in vector registers can be interrupted (between elements) as the vector instruction operates on any element position when exceptional conditions are detected. The exceptional conditions may be for external causes such as input/output actions, or for causes internal to the current program being executed by the CPU. Internal causes include storage access exceptions such as page faults and arithmetic exceptions such as unnormalized operand, exponent overflow and underflow and divide by zero. If an instruction is interrupted before completing the processing of all of the elements in a section, the address of the instruction in the old PSW is not updated to point to the next instruction to be executed.

When an exception is encountered causing an interrupt to occur, the vector interruption index (VIX) points to the appropriate vector register location (in the vector registers or the vector mask register) containing the element (if any) to be processed after the interrupt ends. The general purpose registers which contain the address for a vector element in storage will be updated to contain (point to) the address of the next vector element in storage to be processed when the instruction is resumed. It is understood that the same instruction can be interrupted more than once, and each time the instruction can be reissued and processing of (remaining) elements resumed.

Vector instructions are (or appear to be) executed sequentially, elements of the vector operands of a single vector instruction are (or appear to be) processed sequentially, and any resulting exceptions are (or appear to be) recognized sequentially. If execution is not sequential, and some operations are overlapped for greater performance, the hardware retains enough information to be able to restore all registers to the precise point of interruption, the same as if operation had been purely sequential. Any program interruption is due to the first exception which is recognized and for which interruptions are allowed. Changes to storage locations or register contents, which are to be made by an interrupted vector instruction (or by subsequent vector instructions) after the interruption has ended, will not have been made at the time of the interruption.

When the interruption processing has been completed by the new program so that it is possible to resume the interrupted program, the previously saved registers must be restored to their previous contents. Then, the instruction that was interrupted is re-issued (since the instruction address in the old PSW has not advanced to the next instruction and the old PSW is reinstated as the current PSW) and vector execution resumes from the point of the interruption, i.e. the next element to be processed, as indicated by the VIX for vector registers (or vector mask registers) and by a general purpose (address) register for storage. As is known in the art, the instruction address in the current PSW specifies words (halfwords) to be fetched by CPU 16. (Execution, from the point of interruption, is resumed as long as the content of all registers including VIX and VCT are restored since the interrupted vector instruction is merely reissued.) Since the results obtained by prior execution of the interrupted vector instruction had been stored, resumption of execution of the instruction does not disturb the previously obtained results. In fact, there can be multiple interruptions during the execution of a single vector instruction at different element locations and for different reasons without loss of previously obtained results. Furthermore, a fix-up can be pre-programmed for each exceptional condition, i.e. arithmetic exceptions, so that previously obtained results can be replaced, i.e. the program can fix up the result, before the interrupted instruction resumes execution. For example, the program can replace the result element produced by the hardware with another value and then continue processing the rest of the vector. (The exception-extension code, discussed below, helps the "fix-up" program to locate the result element.) This type of fix-up can occur even if multiple exceptions are encountered during the same instruction execution. When the content of the VIX equals the content of the vector count (VCT) register, the vector instruction goes to completion. After the last vector element has been processed by a vector instruction, the instruction address is automatically updated (advanced) to the next vector instruction, and the VIX is set to zero if the instruction depends on the vector interruption index.

Since vectors are stored in virtual storage, they may cross one or more page boundaries such that a page fault could occur at any element in a vector. In fact, with a large stride, the worst case would be a page fault for every element. For every page fault that occurs, the operating system obtains the missing page (substantially in a manner known in the art), after which execution continues. Too many page faults would reduce system performance since time would be lost in obtaining the missing pages. Nevertheless, the program which processes vectors by executing interruptible vector instructions would still work. If the vector instructions were not interruptible, and their execution could not be resumed from the point of interruption, severe problems would arise. For example, load and store instructions would have to be restarted from the beginning of the vector section without guarantee of success, because additional page faults may occur, or pages would have to be "fixed", i.e. not pageable. Furthermore, arithmetic operations on vectors would be very difficult to restart from the beginning after an exception because partial results may have replaced earlier operand elements.

The execution of a vector instruction generally takes a relatively long time. However, if a vector instruction is interruptible, the operating system can respond faster to external exception conditions (high priority requests) than if it had to wait for the end of the execution of the vector instruction. In particular, the operating system can take quick interim action if the action does not require use of the VPU, since vector registers would not have to be saved to make them available to another program.

In view of the above discussion, interruptible vector instructions serve several purposes. The provide for:
1. Exception fix-ups.
2. Page Fault Handling.
3. Responsiveness.

Exception-Extension Code

When an interruptible vector instruction causes an arithmetic exception, a non-zero exception-extension code (EEC) is stored in bits 0 through 7 of the program interruption code (PIC). The EEC indicates whether the interruption was due to a non-interruptible scalar instruction or an interruptible vector instruction, whether the result, if any, was placed in a scalar or vector register, the width of the result, and the number of the register.

Bit zero of the PIC indicates that the EEC has been stored. In particular, if the arithmetic exception is due to an interruptible vector instruction and causes an interruption which leaves instruction execution partially completed, bit zero is set to 1, and bits 1 through 7 contain the following information:

| Bit 1: | arithmetic result is in vector registers if bit is 1 or in scalar register if bit is 0; |
|---|---|
| Bits 2-3: | contain width (4-byte or 8-byte) of arithmetic result; and |
| Bits 4-7: | contain the register number of result register. |

If the arithmetic exception is due to a scalar (non-vector) instruction, bits 0 through 7 of the PIC are all zeros.

Although this invention has been shown and described with respect to embodiments thereof, it should be understood by those skilled in the art that various changes and omissions in the form and details of the invention may be made therein without departing from the spirit and the scope of the invention.

Having thus described out invention, what we claim as new, and desire to secure by Letters Patent is:

1. In a data processing system including storage, registers including at least one general register and at least one vector register subdivided into vector element locations, vector elements of at least one vector in said storage, means for loading and storing said vector elements in said storage and in said vector register, and at least one central processing unit that executes instructions at least one of which is a vector instructions which operates on said vector elements and references a general register, the method for operating on said elements of said vector which is larger than said vector register comprising the steps of:

a. loading a first register with a number representing the total number of said vector elements to be operated on by said vector instruction during more than one iterative execution of said vector instruction, said total number of said vector elements being more than the number of said vector element locations in said vector register,
   b. executing a machine language instruction which:
      i. loads a seocnd register with a number representing at most the number of said vector element locations in said vector register, said number in said second register indicating the number of elements of said vector to be processed during a single iterative execution of said vector instruction,
      ii. loads said second register with the content of said first regiser when the content of said first register is not greater than the number of vector element locations in said vector, and sets a condition code indicative of the content of said first register, and
      iii. subtracts the content of said second register from the content of said first register and stores the result in said first register, said first register now containing the number of vector elements remaining to be processed during subsequent interative executions of said vector instruction,
   c. executing said vector instruction which references saidi general register that is automatically updated to identify the first element of a group of said vector elements in said vector in storage to be loaded into said vector register, which is also referenced in said vector instruction, said vector elements subsequently loaded in said vector register being processed during a single iterative execution of said vector instruction, the number of elements in said group of elements loaded in said vector register being determined by the content of said second register.
   d. setting and updating one pointer register for continuously identifying each of said vector elements in said vector register to be operated on by said vector instruction,
   e. stopping the operation before any subsequent one of said vector element is processed, if said vector instruction is interrupted, without discarding the results obtained from the operation on each previous one of said vector elements prior to the interruption of said vector instruction,
   f. reissuing said vector instruction after said vector instruction is interrupted and resuming operation on remaining onews of said vector elements identified by said pointer register, thereby starting said reissued vector instruction at the precise point of the interruption, and returning to step e if said vector instruction is interrupted again, and
   g. returning to step b(ii) after completing said single iterative execution of said vector instruction and repeating the steps until said condition code is set to a predetermined value indicating that all of said vector elements have been processed by said vector instruction based on the content of said first register.

2. The data processing system of claim 1 in which said vector instruction performs arithmetic operations on said vector elements stored in said vector register and said vector elements stored in said storage thereby reducing the overhead caused by saving and restoring status information on task switching.

3. In a data processing system including storage, registers including at least one general register and at least one vector register subdivided into vector element locations, vector elements of at least one vector in said storage, means for loading and storing said vector elements in said storage and in said vector register, at least one central processing unit that executes instructions at least one of which is a vector instruction which operates on said vector elements and references a general register, the method for operating on said elements of said vector comprising the steps of:

a. loading a first register with a number representing the total number of said vector elements to be operated on by said vector instruction,
   b. executing a machine language instruction which:
      i. loads a second register with a number representing at most the number of said vector element locations in said vector register, said number in said second register indicating the number of elements of said vector to be processed during a single iterative execution of said vector instruction,
      ii. loads said second register with the content of said first register when the content of said first register is not greater than the number of vector element locations in said vector and sets a condition code indicative of the content of said first register, and
      iii. subtracts the content of said second register from the content of said first register and stores the result in said first register,
   c. executing said vector instruction and loading a group of said vector elements, identified by said general register referenced in said vector instruction, from said vector in storage into said vector register also referenced in said vector instruction, the number of elements in said group of elements loaded in said vector register being determined by the content of said second register,
   d. setting and updating one pointer register for continuously identifying each of said vector elements to be operated on by said vector isntructions,
   e. stopping the operation before any subsequent one of said vector elements is processed, if said vector instruction is interupted, without discarding the results obtained from the operation on each previous one of said vector elements prior to the interruption of said vector instruction,
   f. reissuing said vector instruction after said vector instruction is interrupted and resuming operation on remaining ones of said vector elements identifed by said pointer register, thereby starting said reissued vector instruction at the precise point of the interruption, and returning to step e is said vector instruction is interrupted again and g. returning to step b(ii) after completing said single iterative execution of said vector instructions and repeating the steps if said condition code is not set to a predetermined value indicating that all of said vector elements have been processed by said vector instruction based on the content of said first register.

4. The data processing system of claim 3 in which the number of said vector elements in said at least one vector stored in said storage is greater than the number of said vector element locations in said vector register.

* * * * *